US011673551B2

(12) United States Patent
Kanoh et al.

(10) Patent No.: US 11,673,551 B2
(45) Date of Patent: Jun. 13, 2023

(54) VEHICLE CONTROL APPARATUS AND VEHICLE CONTROL METHOD

(71) Applicant: HONDA MOTOR CO., LTD., Tokyo (JP)

(72) Inventors: Tadahiko Kanoh, Wako (JP); Kunimichi Hatano, Wako (JP); Tsubasa Shibauchi, Tokyo (JP); Yuta Takada, Tokyo (JP); Shogo Kobayashi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 179 days.

(21) Appl. No.: 17/217,384

(22) Filed: Mar. 30, 2021

(65) Prior Publication Data
US 2021/0300366 A1 Sep. 30, 2021

(30) Foreign Application Priority Data

Mar. 31, 2020 (JP) .............................. JP2020-062585

(51) Int. Cl.
B60W 30/165 (2020.01)
B60W 30/18 (2012.01)
(Continued)

(52) U.S. Cl.
CPC ........ B60W 30/165 (2013.01); B60W 30/143 (2013.01); B60W 30/18163 (2013.01);
(Continued)

(58) Field of Classification Search
CPC ............. B60W 30/165; B60W 30/143; B60W 30/18163; B60W 40/04; B60W 40/105;
(Continued)

(56) References Cited

U.S. PATENT DOCUMENTS 6,115,652 A * 9/2000 Sato ................. G08G 1/096783
701/28
8,712,674 B2 4/2014 Maruyama
(Continued)

FOREIGN PATENT DOCUMENTS

JP 2009-149254 A 7/2009
JP 6394554 B2 9/2018
(Continued)

OTHER PUBLICATIONS

Office Action dated Feb. 1, 2022 issued over the corresponding Japanese Patent Application No. 2020-062585 with the English translation thereof.

Primary Examiner — Angelina Shudy
(74) Attorney, Agent, or Firm — Carrier Shende & Associates, P.C.; Joseph P. Carrier; Jeffrey T. Gedeon

(57) ABSTRACT

When following control that causes a user vehicle to follow a following target that is a first other vehicle travelling in a user path in which the user vehicle is travelling is being performed, a travel control section transitions from a state in which the first other vehicle is the following target to a state in which the first other vehicle is not the following target, and in a case where an outside recognizing section recognizes a second other vehicle, which is travelling in another path that is not the user path, the travel control section determines whether to set the second other vehicle as the following target based on a prescribed condition.

12 Claims, 12 Drawing Sheets

(51) Int. Cl.
*B60W 40/04* (2006.01)
*B60W 40/105* (2012.01)
*B60W 30/14* (2006.01)

(52) U.S. Cl.
CPC .......... *B60W 40/04* (2013.01); *B60W 40/105* (2013.01); *B60W 2554/80* (2020.02)

(58) Field of Classification Search
CPC ......... B60W 2554/80; B60W 2552/10; B60W 10/18; B60W 10/20; B60W 30/18154; B60W 50/14; B60W 10/04; B60W 2420/42; B60W 2420/52; B60W 2540/18; B60W 2540/20; B60W 2556/50; B60W 30/16

See application file for complete search history.

(56) References Cited

U.S. PATENT DOCUMENTS

| | | | |
|---|---|---|---|
| 10,525,975 B2* | 1/2020 | Krabot | B60W 30/18154 |
| 11,001,259 B2* | 5/2021 | Wada | B60W 30/143 |
| 11,198,439 B2 | 12/2021 | Mimura | |
| 2016/0362106 A1* | 12/2016 | Maeda | B60W 30/18163 |
| 2017/0066445 A1* | 3/2017 | Habu | B62D 15/026 |
| 2017/0168503 A1* | 6/2017 | Amla | G05D 1/0011 |
| 2017/0313311 A1 | 11/2017 | Niino et al. | |
| 2017/0349176 A1* | 12/2017 | Alden | H04W 4/44 |
| 2018/0120862 A1* | 5/2018 | Dembinski | G05D 1/0293 |
| 2018/0178794 A1* | 6/2018 | Schwindt | B60W 30/162 |
| 2018/0278385 A1* | 9/2018 | Wu | H04W 72/121 |
| 2018/0283885 A1* | 10/2018 | Peterson | G01C 21/3438 |
| 2019/0027045 A1* | 1/2019 | Laur | B60W 30/165 |
| 2019/0225219 A1* | 7/2019 | Ueda | B60W 10/20 |
| 2019/0389463 A1* | 12/2019 | Mizutani | G05D 1/0088 |
| 2020/0019165 A1* | 1/2020 | Levandowski | G06T 7/593 |
| 2020/0117191 A1* | 4/2020 | Ito | B60R 22/48 |
| 2020/0207348 A1* | 7/2020 | Sato | B60W 10/18 |
| 2020/0298851 A1* | 9/2020 | Tanaka | B60W 50/10 |
| 2020/0307634 A1* | 10/2020 | Yashiro | B60W 60/0018 |
| 2020/0317195 A1* | 10/2020 | Natsumi | B60W 30/165 |
| 2020/0377102 A1* | 12/2020 | Kuwahara | B60W 60/0011 |
| 2020/0393847 A1* | 12/2020 | Govindan | G08G 1/096725 |
| 2021/0018918 A1* | 1/2021 | Levandowski | G06N 3/0454 |
| 2021/0107482 A1* | 4/2021 | Uematsu | B60W 30/16 |
| 2021/0129844 A1* | 5/2021 | George | B60W 30/18163 |
| 2021/0284135 A1* | 9/2021 | Koike | B60W 30/06 |
| 2022/0105936 A1* | 4/2022 | Watanabe | B60W 30/165 |
| 2022/0204006 A1* | 6/2022 | Tsuji | B60W 50/029 |
| 2022/0355799 A1* | 11/2022 | Kawakita | B60W 60/001 |

FOREIGN PATENT DOCUMENTS

| | | |
|---|---|---|
| JP | 2019-011055 A | 1/2019 |
| JP | 2020-042612 A | 3/2020 |

* cited by examiner

VEHICLE CONTROL APPARATUS AND VEHICLE CONTROL METHOD

CROSS-REFERENCE TO RELATED APPLICATION

This application is based upon and claims the benefit of priority from Japanese Patent Application No. 2020-062585 filed on Mar. 31, 2020, the contents of which are incorporated herein by reference.

BACKGROUND OF THE INVENTION

Field of the Invention

The present invention relates to a vehicle control apparatus and a vehicle control method for performing travel control of a user vehicle.

Description of the Related Art

Japanese Patent No. 6394554 discloses a driving assistance apparatus that performs so-called ACC (Adaptive Cruise Control), which is control causing the user vehicle to follow another vehicle. This driving assistance apparatus causes the user vehicle to follow a vehicle (other vehicle or adjacent vehicle) whose velocity is closest to the set velocity for the user vehicle, among adjacent vehicles travelling in a lane adjacent to another vehicle travelling in the user lane.

SUMMARY OF THE INVENTION

When the vehicle control apparatus of the user vehicle is performing the ACC with another vehicle travelling in the user lane as a following target, there are cases where the other vehicle suddenly disappears from in front of the user vehicle due to the other vehicle suddenly accelerating, suddenly turning onto a branching path, or the like. In such a case, the ACC is suspended, and this harms the convenience of the vehicle control apparatus.

The present invention has been devised taking into consideration the aforementioned problem, and has the object of providing a vehicle control apparatus and vehicle control method that are highly convenient for the driver.

One aspect of the present invention is a vehicle control apparatus comprising an outside recognizing section that recognizes a situation around a user vehicle; and a travel control section that performs travel control of the user vehicle based on a recognition result from the outside recognizing section; wherein, when following control that causes the user vehicle to follow a following target that is a first other vehicle travelling in a user path in which the user vehicle is travelling is being performed, the travel control section transitions from a state in which the first other vehicle is the following target to a state in which the first other vehicle is not the following target, and in a case where a second other vehicle, which is travelling in another path that is not the user path, is recognized, the travel control section determines whether to set the second other vehicle as the following target based on a prescribed condition.

Another aspect of the present invention is a vehicle control method comprising recognizing a situation around a user vehicle; performing travel control of the user vehicle based on a recognition result in recognizing the situation around the user vehicle; and when following control that causes the user vehicle to follow a following target that is a first other vehicle travelling in a user path in which the user vehicle is travelling is being performed, transitioning from a state in which the first other vehicle is the following target to a state in which the first other vehicle is not the following target, and in a case where a second other vehicle, which is travelling in another path that is not the user path, is recognized, determining whether to set the second other vehicle as the following target based on a prescribed condition.

According to the present invention, it is possible to realize driving assistance that is highly convenient for the driver.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a vehicle control apparatus and vehicle control method according to the present invention will be presented and described below with reference to the accompanying drawings.

1. Configuration of the Vehicle Control Apparatus 10

Figure 1:
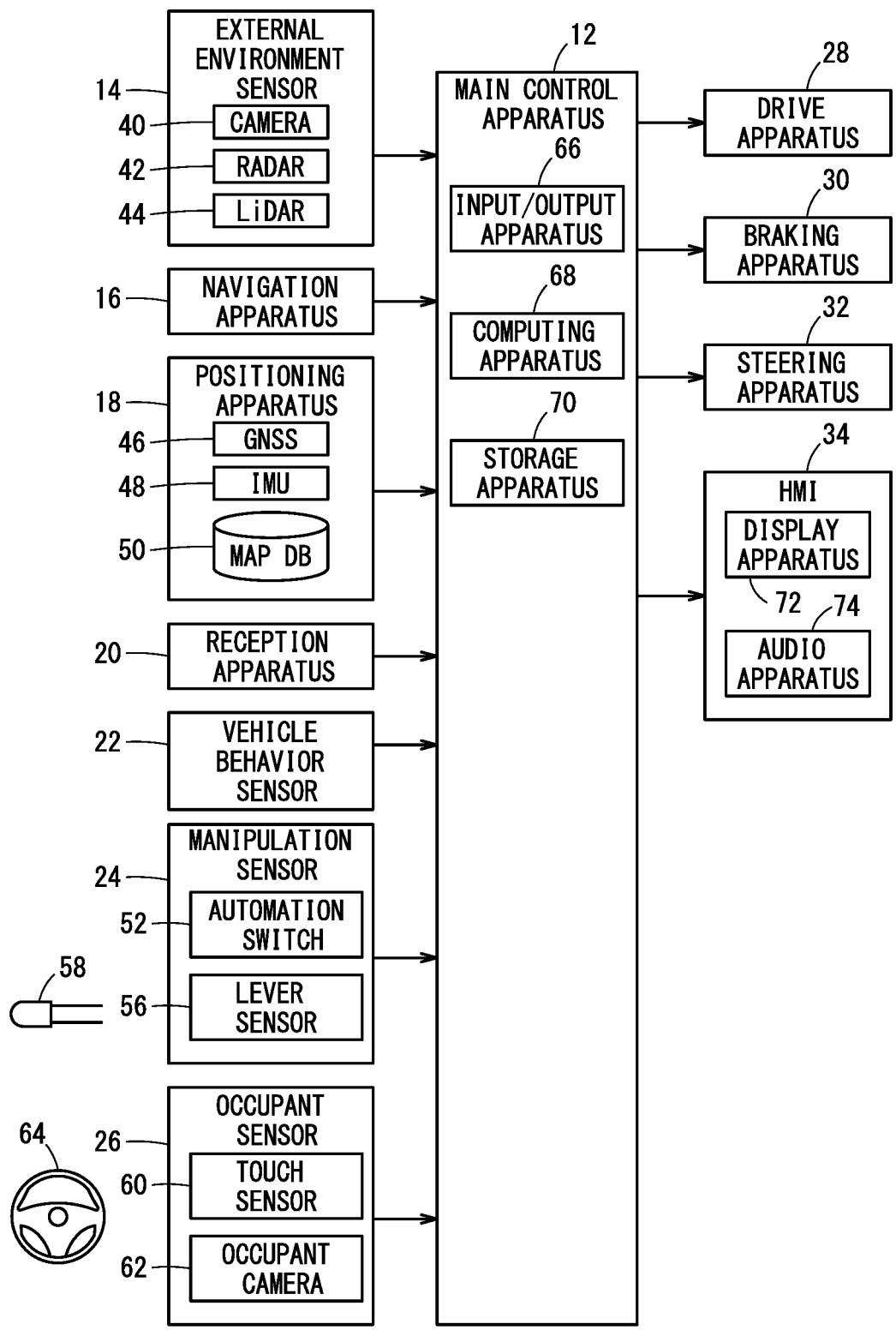
FIG. 1 is a block diagram of a vehicle control apparatus.
Figure 3:
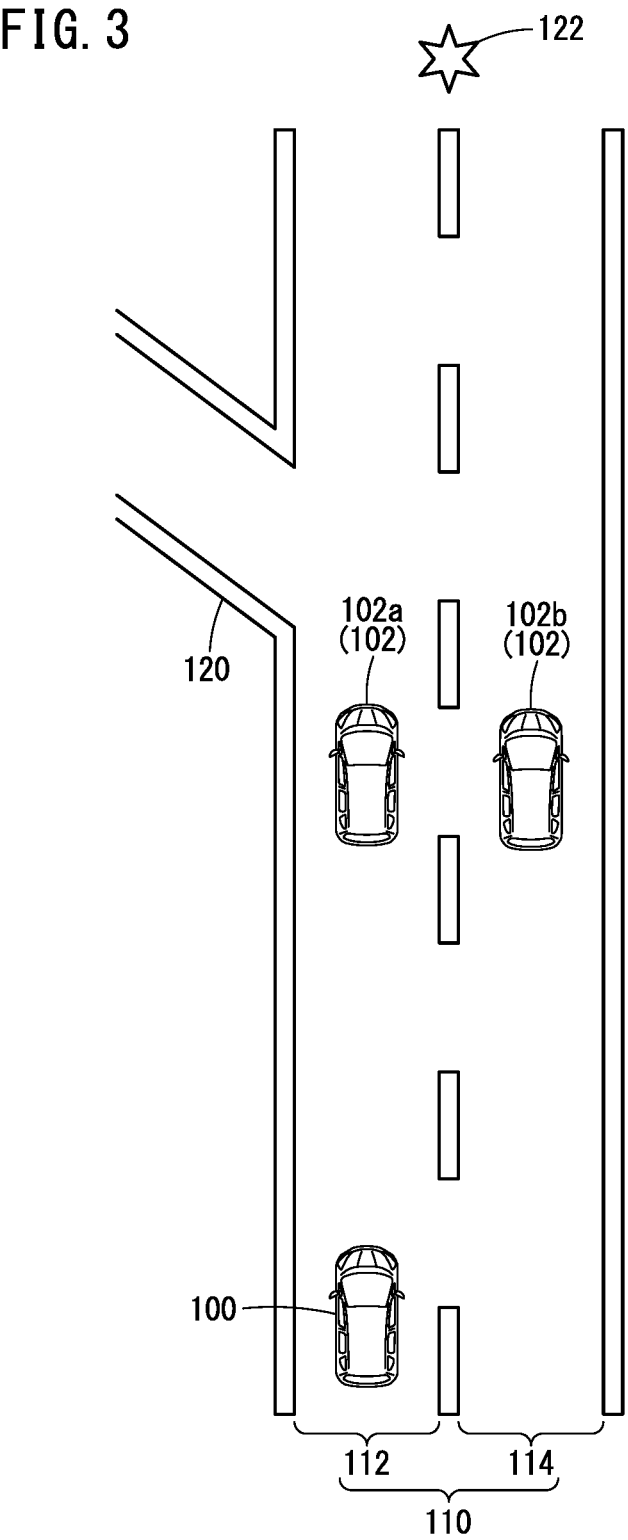
FIG. 3 is a diagram showing a situation in which following control is performed.

The configuration of a vehicle control apparatus 10 will be described using FIG. 1. The vehicle control apparatus 10 is provided to a user vehicle 100 (FIG. 3). The vehicle control apparatus 10 has a so-called driving assistance function, to perform control of the travel velocity and steering of the user vehicle 100 without manipulations made by a driver. In the present embodiment, following control (ACC), constant velocity control (CC: Cruise Control), and automatic lane change control (ALC: Automatic Lane Change) are performed as the driving assistance. Furthermore, when the following control or the constant velocity control are performed, lane maintenance control is also performed along with these. In this Specification, a lane includes, in addition to paths defined by dividing lines, paths that are not defined by dividing lines.

The vehicle control apparatus 10 includes a main control apparatus 12, an input apparatus group for inputting various types of information into the main control apparatus 12, and an output apparatus group for operating the user vehicle 100 based on various types of information output by the main control apparatus 12. The input apparatus group includes an external environment sensor 14, a navigation apparatus 16, a positioning apparatus 18, a reception apparatus 20, a vehicle behavior sensor 22, a manipulation sensor 24, and an occupant sensor 26. The output apparatus group includes a drive apparatus 28, a braking apparatus 30, a steering apparatus 32, and an HMI (Human Machine Interface) 34.

[1.1. Configuration of the Input Apparatus Group]

The external environment sensor 14 includes a plurality of cameras 40, a plurality of radars 42, and a plurality of LiDARs 44. The cameras 40 capture images of the surroundings of the user vehicle 100 and output image information to the main control apparatus 12. The radars 42 and LiDARs 44 detect a target in the vicinity of the user vehicle 100, and output detection information to the main control apparatus 12.

The navigation apparatus 16 measures the position of the user vehicle 100 using GPS (Global Positioning System), and generates a scheduled travel route from the position of the user vehicle 100 to a destination 122 (FIG. 3 and the like) designated by the driver. The navigation apparatus 16 outputs route information indicating the generated scheduled travel route to the main control apparatus 12.

The positioning apparatus 18 includes a GNSS (Global Navigation Satellite System), an IMU (Inertial Measurement Unit) 48, and a map DB (database) 50. The positioning apparatus 18 measures the position of the user vehicle 100 using the GNSS 46 and the IMU 48, and outputs user vehicle position information indicating the position of the user vehicle 100 to the main control apparatus 12. Furthermore, the positioning apparatus 18 outputs map information, which is stored in the map DB 50, to the main control apparatus 12. The map information stored in the map DB 50 is higher-precision information that the map information stored in the navigation apparatus 16, and includes various types of information (such as information in lane units).

The reception apparatus 20 includes first to third reception terminals (not shown in the drawings). The first reception terminal receives wide-area information broadcast by broadcasting stations. The second reception terminal receives local information transmitted by roadside devices installed along a path 110 (FIG. 3 and the like). The third reception terminal receives other vehicle information transmitted by another vehicle 102 (FIG. 3 and the like). The first to third reception terminals output the various types of received information to the main control apparatus 12.

The vehicle behavior sensor 22 includes each sensor for measuring the behavior (travel velocity, acceleration/deceleration, yaw rate, and the like) of the user vehicle 100. Each sensor outputs the detected information to the main control apparatus 12.

The manipulation sensor 24 includes an automation switch 52 and a lever sensor 56. The automation switch 52 outputs, to the main control apparatus 12, instruction information including instructions for automating control of or eliminating automated control of any one of the travel velocity and the steering, in response to a switching manipulation performed by the driver. The lever sensor 56 detects the manipulation position of a blinker lever 58, and outputs manipulation position information indicating the manipulation position of the blinker lever 58 to the main control apparatus 12. Furthermore, the manipulation sensor 24 includes various sensors for detecting the manipulation amounts of manipulators (acceleration pedal, brake pedal, and steering wheel 64).

The occupant sensor 26 includes a touch sensor 60 and an occupant camera 62. The touch sensor 60 is an electrostatic capacitance sensor or a pressure sensor provided to the steering wheel 64. The touch sensor 60 detects the gripping state (contact state) of the driver on the steering wheel 64, and outputs detection information to the main control apparatus 12. The occupant camera 62 captures an image of the driver, and outputs image information to the main control apparatus 12.

[1.2. Configuration of the Main Control Apparatus 12]

The main control apparatus 12 is formed by an ECU (Electronic Control Unit). The main control apparatus 12 includes an input/output apparatus 66, a computing apparatus 68, and a storage apparatus 70. The input/output apparatus 66 includes an A/D conversion circuit, a communication interface, and the like. The computing apparatus 68 includes a processor such as a CPU (Central Processing Unit), for example. The computing apparatus 68 realizes various functions by executing a program stored in the storage apparatus 70. The various functions of the computing apparatus 68 are described below in section [1.4]. The storage apparatus 70 includes a RAM, a ROM, and the like. The storage apparatus 70 stores various programs and numerical value information, such as threshold values used in the processing performed by the computing apparatus 68.

[1.3. Configuration of the Output Apparatus Group]

The drive apparatus 28 includes a drive force output ECU and a control target of the drive force output ECU (neither of which are shown in the drawings). The drive apparatus 28 adjusts the drive force according to instruction information (drive instructions) output by the main control apparatus 12.

The braking apparatus 30 includes a braking ECU and a control target of the braking ECU (neither of which are shown in the drawings). The braking apparatus 30 adjusts the braking force according to instruction information (braking instructions) output by the main control apparatus 12.

The steering apparatus 32 includes an EPS (Electric Power Steering) ECU and a control target of the EPS ECU (neither of which are shown in the drawings). The steering apparatus 32 adjusts the steering amount according to instruction information (steering instructions) output by the main control apparatus 12.

The HMI 34 includes a display apparatus 72 and an audio apparatus 74. The display apparatus 72 outputs video according to instruction information (notification instructions) output by the main control apparatus 12. The audio apparatus 74 outputs sound according to instruction information (notification instructions) output by the main control apparatus 12.

[1.4. Various Functions of the Computing Apparatus 68]

Figure 2:
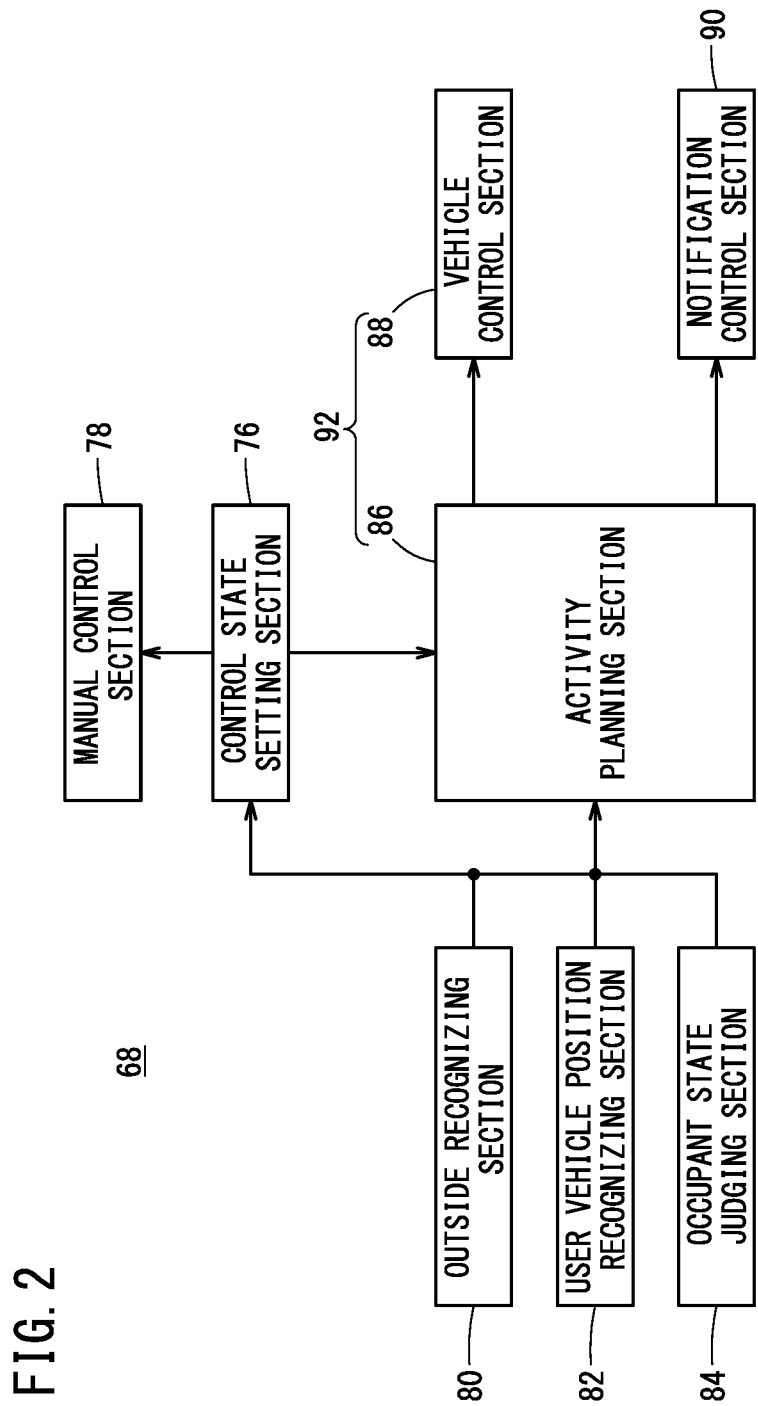
FIG. 2 is a function block diagram of a computing apparatus.

The various functions realized by the computing apparatus 68 will be described using FIG. 2. The computing apparatus 68 functions as a control state setting section 76, a manual control section 78, an outside recognizing section 80, a user vehicle position recognizing section 82, an occupant state determining section 84, an action planning section 86, a vehicle control section 88, and a notification control section 90. The action planning section 86 and the vehicle control section 88 are referred to collectively as a travel control section 92.

The control state setting section 76 judges whether the various types of travel control (travel velocity control and steering control) are performed using manual control or automated control, according to a manipulation performed with the automation switch 52.

The manual control section 78 performs travel control relating to the manual control in accordance with manipulation amounts of the manipulators (acceleration pedal, brake pedal, and steering wheel 64) output by the manipulation sensor 24. The manual control section 78 outputs instruction information (drive instructions, braking instructions, and steering instructions) relating to the manual control to the drive apparatus 28, the braking apparatus 30, and the steering apparatus 32.

The outside recognizing section 80 recognizes the situation around the user vehicle 100 based on the image information and detection information output by the external environment sensor 14. The user vehicle position recognizing section 82 recognizes the position of the user vehicle 100 based on the user vehicle position information and the map information output by the positioning apparatus 18. The occupant state determining section 84 judges the gripping state (touching or not) of the driver on the steering wheel 64, based on the detection information output by the touch sensor 60. Furthermore, the occupant state determining section 84 recognizes the observational state of the driver (whether the driver is looking forward, whether the driver's eyes are open) based on the image information output by the occupant camera 62.

The action planning section 86 establishes an action plan relating to the automated control, based on the recognition result of the outside recognizing section 80 and the recognition result of the user vehicle position recognizing section 82. For example, the action planning section 86 generates a local map (dynamic map) that includes static information and dynamic information about the area around the user vehicle 100. The action planning section 86 judges the optimal action based on the local map and the state of the user vehicle 100 (travel velocity, steering, and travel position), and obtains the travel velocity and travel trajectory for realizing this action.

The vehicle control section 88 performs travel control relating to the automated control, in accordance with the action plan. For example, the vehicle control section 88 calculates the acceleration/deceleration for causing the user vehicle 100 to travel at the travel velocity obtained by the action planning section 86. Furthermore, the vehicle control section 88 calculates a steering angle for causing the user vehicle 100 to travel along the travel trajectory obtained by the action planning section 86. The vehicle control section 88 outputs the instruction information (drive instructions, braking instructions, and steering instructions) relating to the automated control to the drive apparatus 28, the braking apparatus 30, and the steering apparatus 32. The notification control section 90 outputs the instruction information (notification information) to the HMI 34 when a notification occurs in the travel plan.

2. Outline of the Present Embodiment

Figure 4:
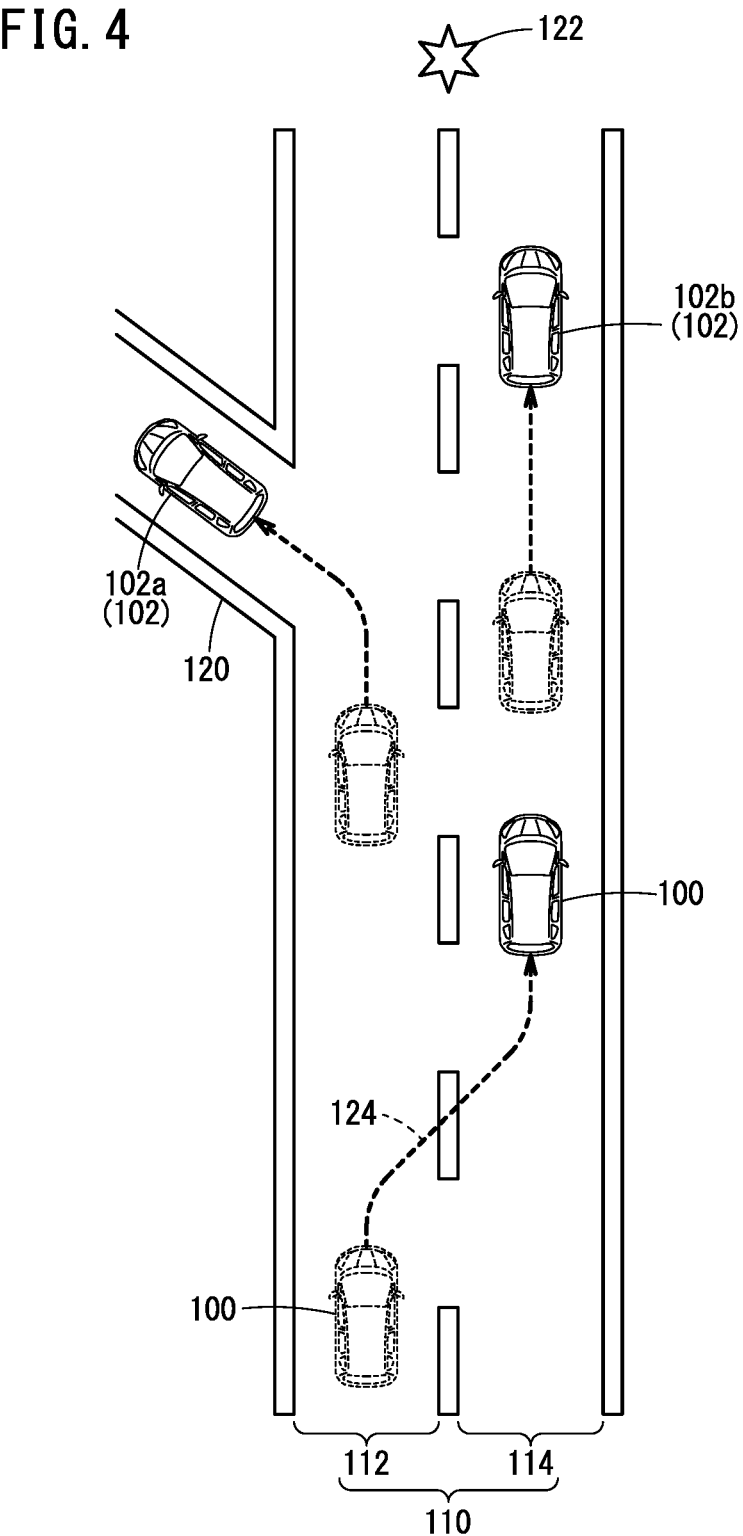
FIG. 4 is a diagram showing a situation in which the following control is continued with a second other vehicle travelling in a second lane as the following target.
Figure 5:
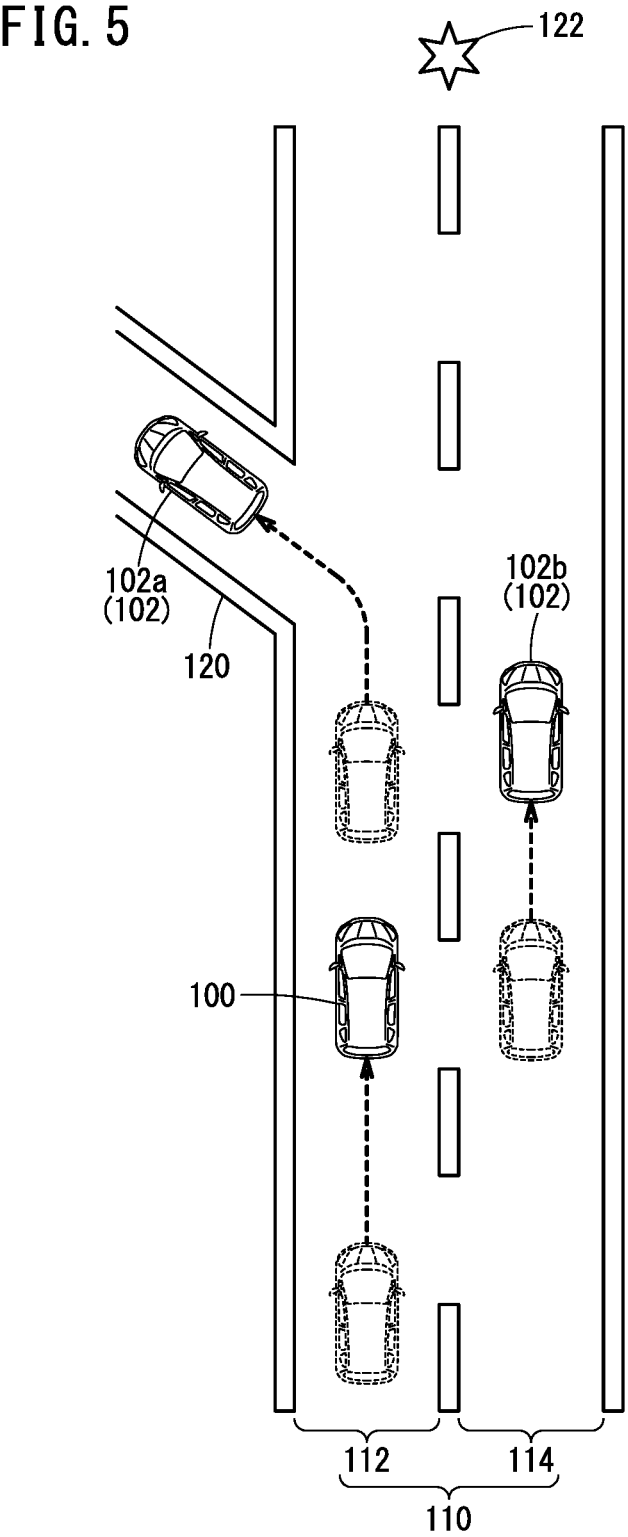
FIG. 5 is a diagram showing a situation in which control is switched from following control to constant velocity control.

An outline of the present embodiment will be described using FIGS. 3 to 5. As shown in FIG. 3, the user vehicle 100 travels in a first lane 112. The lane in which the user vehicle 100 travels, which is the first lane 112 here, is referred to as the user lane. Each lane other than the user lane, a second lane 114 here, is referred to as another lane. Among the other vehicles 102 travelling ahead of the user vehicle 100, the other vehicle 102 travelling in the user lane (first lane 112) is referred to as a first other vehicle 102a. Furthermore, the other vehicle 102 travelling in the other lane (second lane 114) is referred to as a second other vehicle 102b. In this Specification, the other vehicle 102 travelling in the user lane is uniformly referred to as the first other vehicle 102a, and the other vehicle 102 travelling in the other lane is uniformly referred to as the second other vehicle 102b. For example, when the user vehicle 100 has changed lanes from the first lane 112 to the second lane 114, the second lane 114 becomes the user lane and the first lane 112 becomes the other lane. Therefore, the other vehicle 102 travelling in the first lane 112 becomes the second other vehicle 102b, and the other vehicle 102 travelling in the second lane 114 becomes the first other vehicle 102a.

In the situation shown in FIG. 3, the vehicle control apparatus 10 performs following control with the first other vehicle 102a as a following target. As shown in FIG. 4, when the first other vehicle 102a progresses to a branching path 120, the vehicle control apparatus 10 becomes unable to recognize the following target. In addition to this, in a case where the inter-vehicle distance between the user vehicle 100 and the first other vehicle 102a becomes greater than a recognition distance of the external environment sensor 14, the vehicle control apparatus 10 becomes unable to recognize the following target. Furthermore, the vehicle control apparatus 10 judges whether to set the first other vehicle 102a as the following target based on following conditions described further below (see Section [2.1]). When the following condition is no longer satisfied, the vehicle control apparatus 10 removes the first other vehicle 102a from being a following target. In cases such as described above, the vehicle control apparatus 10 transitions from a state in which the first other vehicle 102a is a following target to a state in which the first other vehicle 102a is not a following target.

In such a case, the vehicle control apparatus 10 judges whether a prescribed condition (including the following condition) is satisfied with the second other vehicle 102b as the target. Then, if this prescribed condition is satisfied, the vehicle control apparatus 10 performs the lane change from the first lane 112 to the second lane 114 and performs the following control with the second other vehicle 102b as the following target. On the other hand, as shown in FIG. 5, if the prescribed condition is not satisfied, the vehicle control apparatus 10 switches the control being performed from the following control to the constant velocity control. Furthermore, when another vehicle 102 that is to be a following target is found after switching to the constant velocity control, the vehicle control apparatus 10 switches the control being performed from the constant velocity control to the following control. A detailed process is described below in section [3].

[2.1. Following Condition]

The following condition determined for the following control includes one or all of the types of, distance between, velocities of, and the like of the user vehicle 100 and the other vehicle 102. For example, if the user vehicle 100 and the other vehicle 102 are the same type, the action planning section 86 can set the other vehicle 102 as the following target. The type may be classified according to the vehicle class, or may be classified according to the vehicle type (passenger vehicle, truck, motorcycle, or the like). The vehicle class is classified according to, for example, vehicle size, engine capacity, drive motor performance, and the like. Information concerning the type may be acquired by having the outside recognizing section 80 recognize the detection information of the external environment sensor 14, or may be acquired by having the reception apparatus 20 receive information transmitted from the other vehicle 102. The type of the user vehicle 100 is stored in the storage apparatus 70.

If the distance between the user vehicle 100 and the other vehicle 102 is less than or equal to a prescribed distance, the action planning section 86 can set the other vehicle 102 as a following target. Furthermore, if the velocity difference between the set velocity for the user vehicle 100 and the travel velocity of the other vehicle 102 is less than or equal to a prescribed difference, the action planning section 86 can set the other vehicle 102 as a following target. The set velocity may be a velocity set by the driver, a velocity set automatically based on a recognized speed limit sign, or a velocity set automatically based on the recognized velocity of surrounding vehicles. Furthermore, if the velocity difference between the travel velocities of the user vehicle 100 and the other vehicle 102 is less than or equal to a prescribed difference, the action planning section 86 can set the other vehicle 102 as a following target. The information concerning the prescribed distance, prescribed difference, set velocity, and the like are stored in the storage apparatus 70.

3. Processing Performed by the Vehicle Control Apparatus 10

[3.1. Other Vehicle Following Process]

Figure 6:
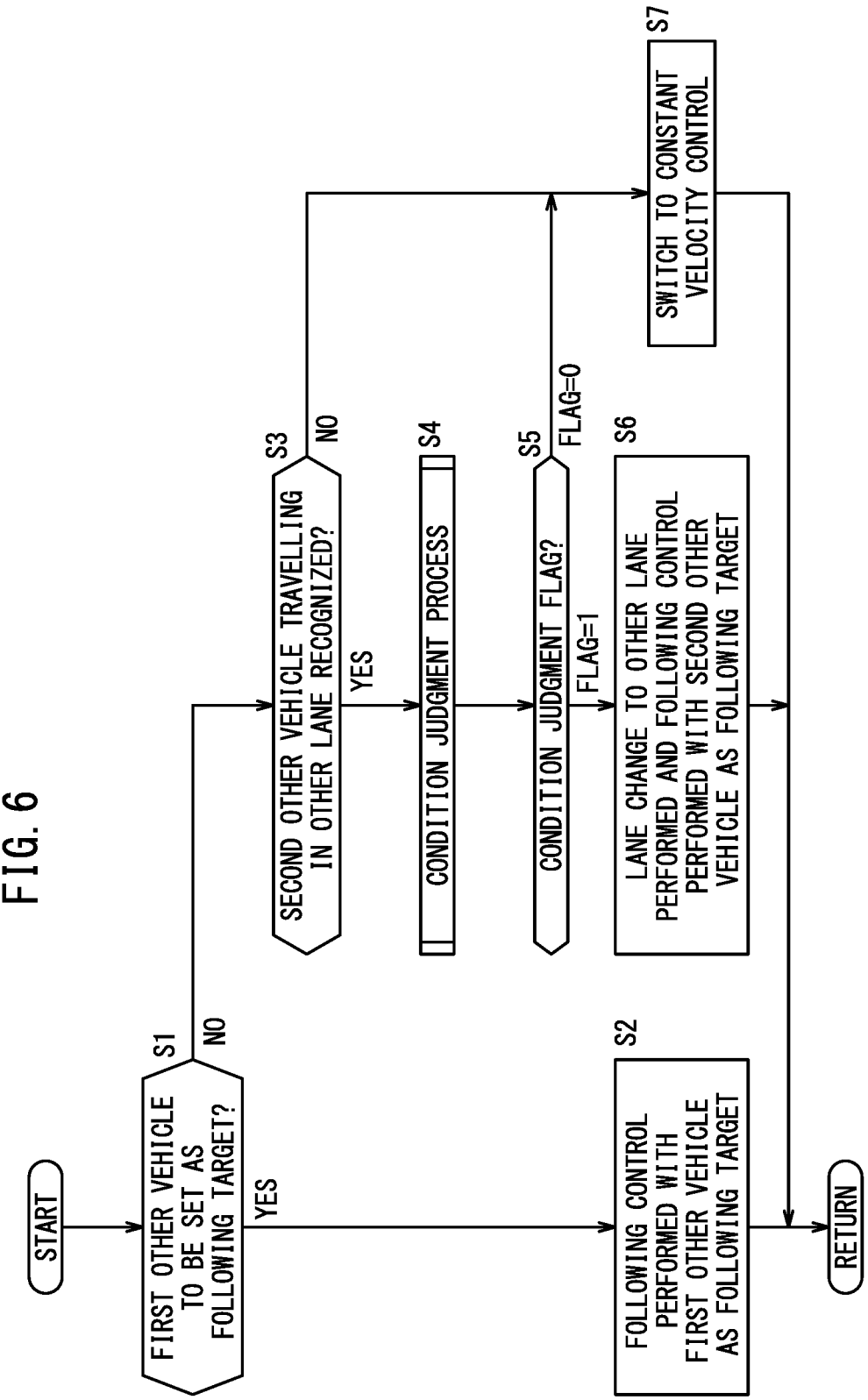
FIG. 6 is a flow chart of the other-vehicle following process.

The other-vehicle following process performed by the vehicle control apparatus 10 will be described using FIG. 6. The other-vehicle following process shown in FIG. 6 is performed at prescribed time intervals while the vehicle control apparatus 10 is performing the following control, in response to the situation shown in FIG. 3, i.e. the manipulation of the automation switch 52 by the driver. While the vehicle control apparatus 10 is performing the following control, the outside recognizing section 80 recognizes the first other vehicle 102a.

At step S1, the action planning section 86 judges whether the first other vehicle 102a recognized by the outside recognizing section 80 is to be set as a following target. The action planning section 86 judges whether the first other vehicle 102a is to be set as the following target based on the following condition (see section [2.1] above). The action planning section 86 sets the first other vehicle 102a as the following target if the following condition is satisfied. In this case (step S1: YES), the process moves to step S2. On the other hand, the action planning section 86 does not set the first other vehicle 102a as the following target if the following condition is not satisfied. In this case (step S1: NO), the process moves to step S3.

At step S2, the travel control section 92 performs (continues) the following control with the first other vehicle 102a as the following target. In other words, the action planning section 86 and the vehicle control section 88 perform velocity control causing the user vehicle 100 to follow the first other vehicle 102a. Furthermore, the action planning section 86 and the vehicle control section 88 perform steering control to cause the user vehicle 100 to stay in the first lane 112. When step S2 ends, the other-vehicle following process shown in FIG. 6 also ends for now.

When the process moves from step S1 to step S3, the action planning section 86 judges whether the outside recognizing section 80 recognizes the second other vehicle 102b. If the outside recognizing section 80 recognizes the second other vehicle 102b (step S3: YES), the process moves to step S4. On the other hand, if the outside recognizing section 80 does not recognize the second other vehicle 102b (step S3: NO), the process moves to step S7.

At step S4, the action planning section 86 performs the condition judgment process described in sections [3.2] and [3.3] below. The condition judgment process is a process of judging whether the second other vehicle 102b is to be set as a new following target of the following control, based on a prescribed condition. When step S4 ends, the process moves to step S5.

At step S5, the action planning section 86 judges a condition judgment flag. The condition judgment flag is a flag indicating whether the prescribed condition is satisfied. The condition judgment flag is 1 when the prescribed condition is satisfied, and the condition judgment flag is 0 when the prescribed condition is not satisfied. If the condition judgment flag is 1 (step S5: FLAG=1), the process moves to step S6. On the other hand, if the condition judgment flag is 0 (step S5: FLAG=0), the process moves to step S7.

At step S6, the travel control section 92 performs an automated lane change and performs the following control with the second other vehicle 102b as the following target. As shown in FIG. 4, the action planning section 86 generates a travel trajectory 124 from the user lane (first lane 112) to the other lane (second lane 114) in which the second other vehicle 102b is travelling. The vehicle control section 88 causes the user vehicle 100 to travel along this travel trajectory 124. After the user vehicle 100 has performed the lane change, the action planning section 86 and the vehicle control section 88 perform velocity control to cause the user vehicle 100 to follow the second other vehicle 102b. Furthermore, the action planning section 86 and the vehicle control section 88 perform steering control to keep the user vehicle 100 in the second lane 114. When step S6 ends, the other-vehicle following process shown in FIG. 6 also ends for now.

When the process moves from step S3 or step S5 to step S7, the travel control section 92 switches the driving assistance control being performed from the following control to the constant velocity control. The action planning section 86 and the vehicle control section 88 perform velocity control to cause the user vehicle 100 to travel at the set velocity set by the driver. Further, the action planning section 86 and the vehicle control section 88 perform the steering control to keep the user vehicle 100 in the first lane 112. At this time, if the first other vehicle 102a is detected to be travelling at a velocity lower than the set velocity, the action planning section 86 and the vehicle control section 88 perform a lane change and overtake the first other vehicle 102a. When step S7 ends, the other-vehicle following process shown in FIG. 6 also ends. Then, the constant velocity travel process described in section [3.4] below is started.

[3.2. Condition Judgment Process (1)]

Figure 7:
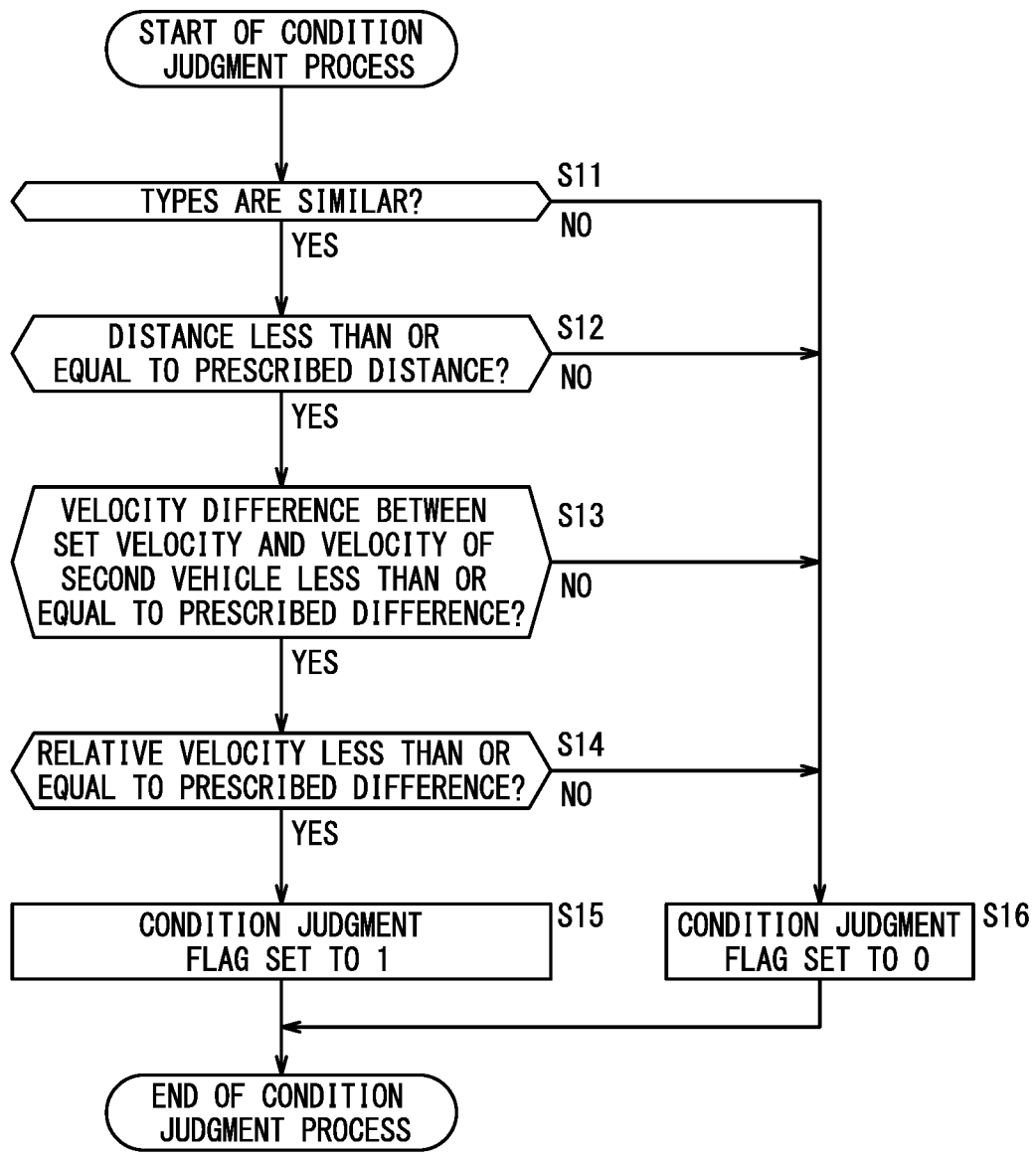
FIG. 7 is a flow chart of a condition judgment process (1)

At step S4 of the other-vehicle following process shown in FIG. 6, the condition judgment process (1) shown in FIG. 7 is performed. The following condition described in section [2.1] above is set as the prescribed condition in the condition judgment process (1).

At step S11, the action planning section 86 judges whether the type of the user vehicle 100 and the type of the second other vehicle 102b are similar. Here, "similar" is a concept that includes not only perfectly matching, but also allows for a certain amount of difference. For example, the "types are similar" in a case where the difference between a numerical value (vehicle size or the like) exhibited by the type of the user vehicle 100 and a numerical value exhibited by the type of the second other vehicle 102b is less than or equal to a certain difference. If the types are similar (step S11: YES), the process moves to step S12. On the other hand, if the types are different (step S11: NO), the process moves to step S16.

At step S12, the action planning section 86 judges whether the distance between the user vehicle 100 and the second other vehicle 102b is less than or equal to the prescribed distance. If this distance is less than or equal to the prescribed distance (step S12: YES), the process moves to step S13. On the other hand, if this distance is greater than the prescribed distance (step S12: NO), the process moves to step S16. Instead of judging the distance between the user vehicle 100 and the second other vehicle 102b, the action planning section 86 may judge the travel time needed for the user vehicle 100 to reach the position of the second other vehicle 102b. In such a case, the action planning section 86 calculates the travel time from the travel velocity of the user vehicle 100 and the distance from the position of the user vehicle 100 to the position of the second other vehicle 102b.

At step S13, the action planning section 86 judges whether the velocity difference between the set velocity for the user vehicle 100 and the travel velocity of the second other vehicle 102b is less than or equal to a prescribed difference. If the velocity difference is less than or equal to the prescribed difference (step S13: YES), the process moves to step S14. On the other hand, if the velocity difference is greater than the prescribed difference (step S13: NO), the process moves to step S16.

At step S14, the action planning section 86 judges whether the relative velocity (velocity difference) between the travel velocities of the user vehicle 100 and the second other vehicle 102b is less than or equal to a prescribed difference. If the relative velocity is less than or equal to the prescribed difference (step S14: YES), the process moves to step S15. On the other hand, if the relative velocity is greater than the prescribed difference (step S14: NO), the process moves to step S16.

At step S15, the action planning section 86 sets the condition judgment flag to 1. On the other hand, at step S16, the action planning section 86 sets the condition judgment flag to 0. When step S15 or step S16 ends, the condition judgment process (1) ends. After this, the process moves to step S5 in the other-vehicle following process shown in FIG. 6.

In the condition judgment process (1), the condition judgment flag is set to 1 if all of the conditions of step S11 to step S14 are satisfied. Instead, the condition judgment flag may be set to 1 if any one of the conditions of step S11 to step S14 is satisfied.

[3.3. Condition Judgment Process (2)]

Figure 8:
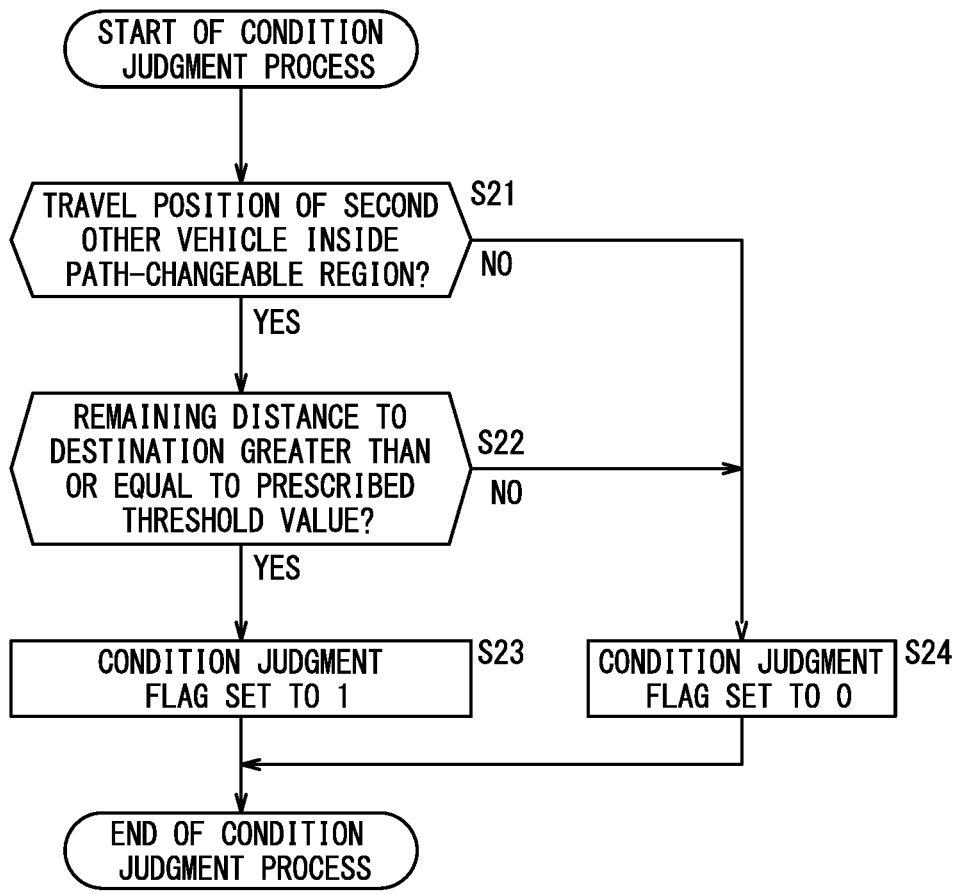
FIG. 8 is a flow chart of a condition judgment process (2)

If a destination 122 is set in the navigation apparatus 16, at step S4 of the other-vehicle following process shown in FIG. 6, the condition judgment process (2) shown in FIG. 8 may be performed. A condition concerning a path-changeable region 130 (step S21) and a condition concerning the remaining distance to the destination 122 or the branching path 120 (step S22) are set as the prescribed conditions in the condition judgment process (2).

Figure 9:
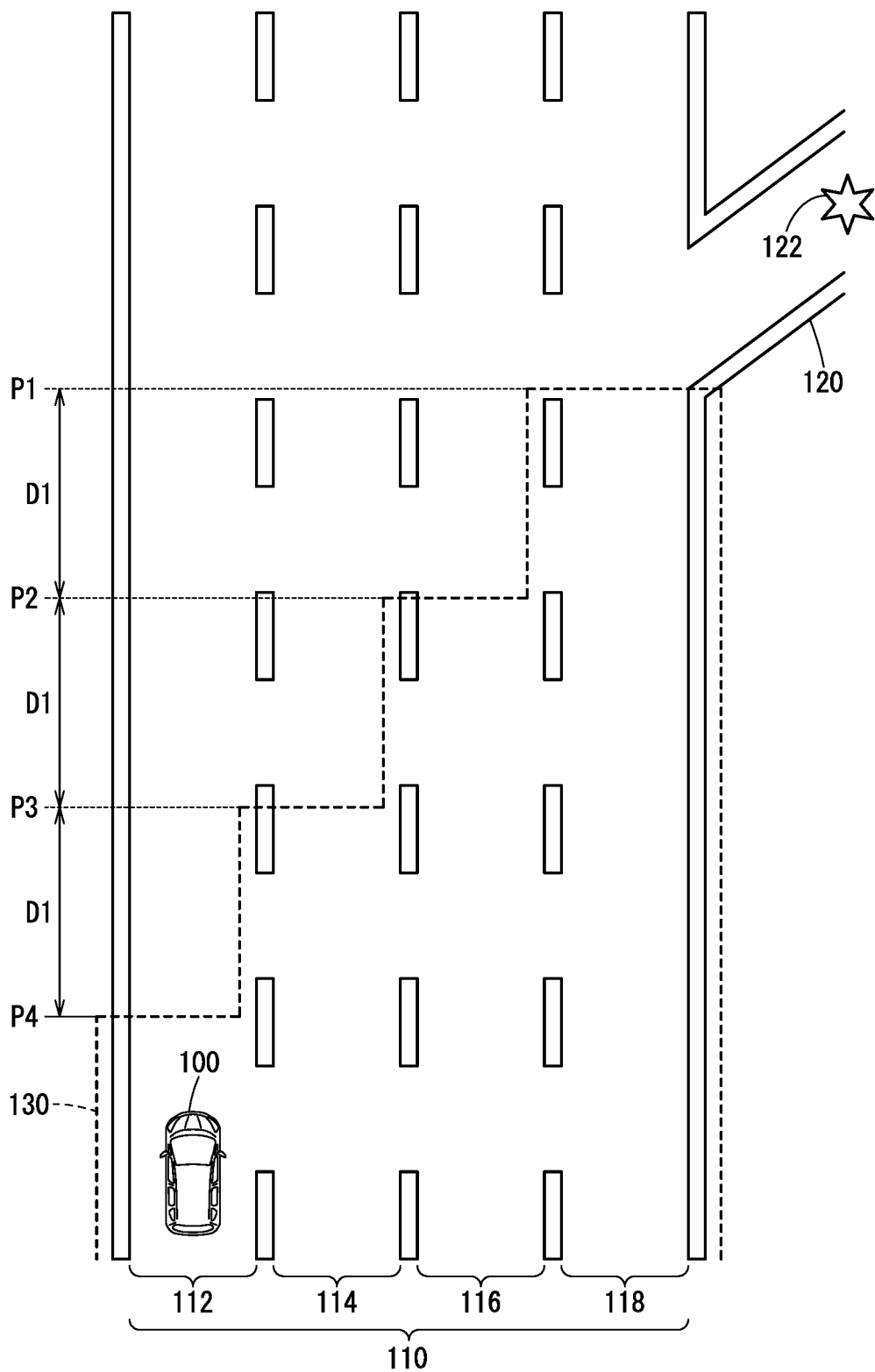
FIG. 9 is a diagram showing a path-changeable region.

Here, the path-changeable region 130 is described using FIG. 9. The path-changeable region 130 is a region in which it is judged that an automated lane change can be performed, based on the lane change time needed from the start to the end of the automated lane change, the position of the branching path 120 (position of the destination 122), and the travel velocity of the user vehicle 100. The lane change time includes a wait time (surrounding area observation time) before lateral movement is started, movement time for the movement from the user lane to the other lane adjacent thereto, and adjustment time for adjusting the travel position in the other lane. A distance D1 is necessary for the automated lane change from the user lane to the other lane adjacent thereto, based on the lane change time and the travel velocity of the user vehicle 100.

For example, as shown in FIG. 9, it is assumed that the destination 122 of the user vehicle 100 is beyond the branching path 120. In order for the user vehicle 100 travelling on the path 110 to progress to the branching path 120, the user vehicle 100 must travel in the fourth lane 118 at the branching position P1 of the branching path 120. Furthermore, in order for the user vehicle 100 to travel in the fourth lane 118 at the branching position P1, the user vehicle 100 must travel in the fourth lane 118 or the third lane 116 at a position P2 that is a distance D1 farther backward than the branching position P1. Similarly, the user vehicle 100 must travel in the fourth lane 118, the third lane 116, or the second lane 114 at a position P3 that is the distance D1 farther backward than the position P2. Similarly, the user vehicle 100 must travel in the fourth lane 118, the third lane 116, the second lane 114, or the first lane 112 at a position P4 that is the distance D1 farther backward than the position P3.

The action planning section 86 detects the branching position P1 based on the map information stored in the navigation apparatus 16. The action planning section 86 then sets the boundary position (positions P2 to P4) for the automated lane change in each lane, based on the branching position P1, the lane change time, and the travel velocity of the user vehicle 100. In this way, the path-changeable region 130 is set with the branching position P1 as a reference.

At step S21, the action planning section 86 judges whether the travel position of the second other vehicle 102b is inside or outside the path-changeable region 130. If it is assumed that the action planning section 86 selects the second other vehicle 102b travelling outside the path-changeable region 130 as the following target, the user vehicle 100 travels outside the path-changeable region 130. In this case, the user vehicle 100 cannot travel in the fourth lane 118 at the branching position P1, and therefore cannot reach the destination 122. Therefore, in the present embodiment, this second other vehicle 102b is excluded from being a following target. If the travel position of the second other vehicle 102b is inside the path-changeable region 130 (step S21: YES), the process moves to step S22. On the other hand, if the travel position of the second other vehicle 102b is outside the path-changeable region 130 (step S21: NO), the process moves to step S24.

Figure 10:
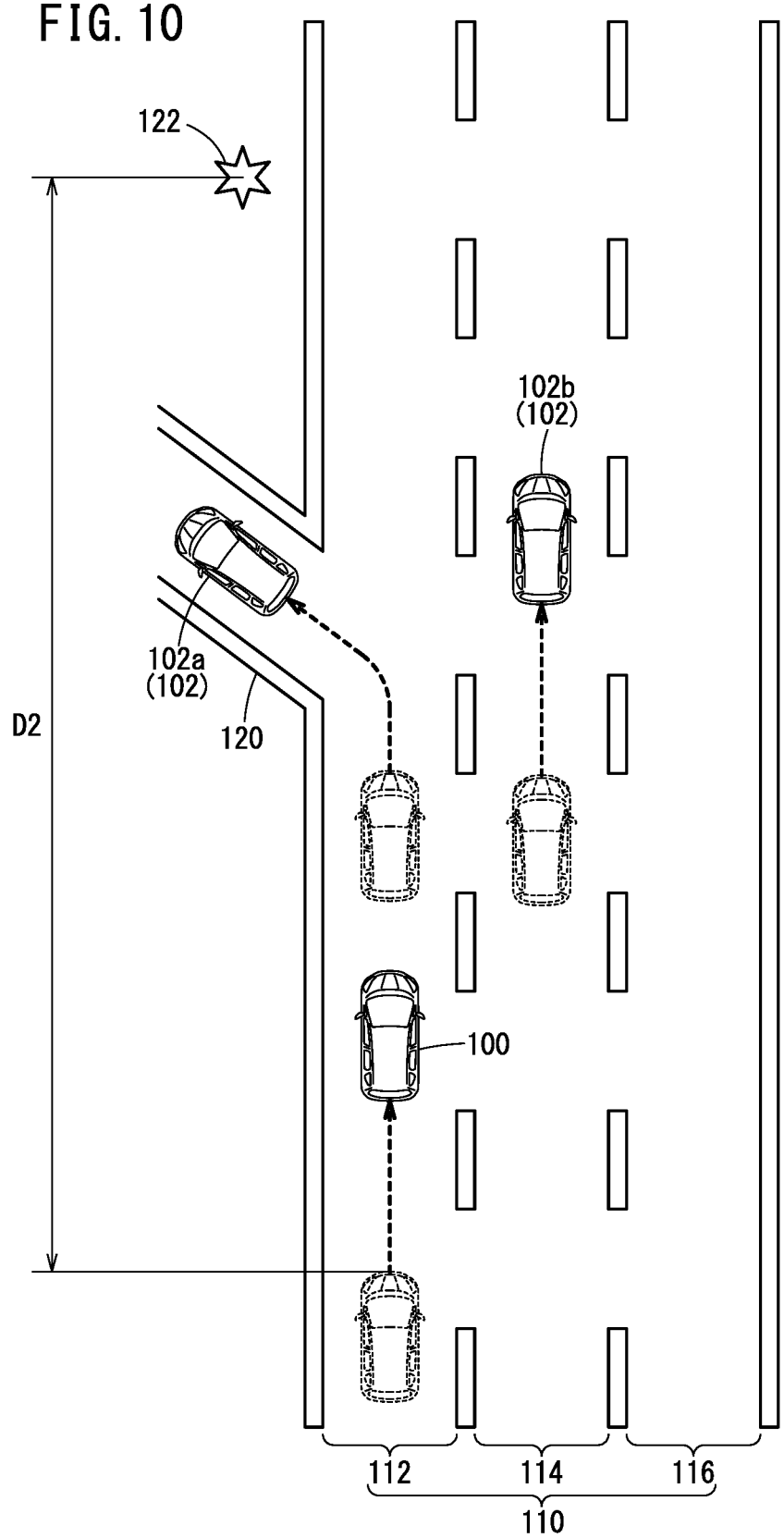
FIG. 10 is a diagram showing a remaining distance from the travel position of the user vehicle to a destination.

At step S22, the action planning section 86 judges whether the remaining distance from the travel position of the user vehicle 100 to the destination 122 is greater than or equal to a prescribed threshold value D2. This remaining distance is detected by the navigation apparatus 16. The action planning section 86 determines the optimal lane for reaching the destination 122, and sets this lane as a recommended lane. For example, in the situation shown in FIG. 10, the recommended lane is the first lane 112. Here, it is assumed that the action planning section 86 has selected the second other vehicle 102b travelling in the other lane (second lane 114), which is not the recommended lane (first lane 112), as the following target, in a state where the destination 122 is close. In such a case, the user vehicle 100 must make a lane change to the other lane (second lane 114) and then quickly make a lane change to the recommended lane (first lane 112) again. This action is inefficient. Therefore, in the present embodiment, this second other vehicle 102b is excluded from being a following target. The prescribed threshold value D2 is stored in advance in the storage apparatus 70. If the remaining distance is greater than or equal to the prescribed threshold value D2 (step S22: YES), the process moves to step S23. On the other hand, if the remaining distance is less than the prescribed threshold value D2 (step S22: NO), the process moves to step S24.

At step S22, the action planning section 86 may judge whether the remaining distance from the travel position of the user vehicle 100 to the branching position P1 of the branching path 120 that leads to the destination 122 is greater than or equal to the prescribed threshold value D2.

At step S23, the action planning section 86 sets the condition judgment flag to 1. On the other hand, at step S24, the action planning section 86 sets the condition judgment flag to 0. When step S23 or step S24 ends, the condition judgment process (2) ends. After this, the process moves to step S5 of the other-vehicle following process shown in FIG. 6.

In the condition judgment process (2), the condition judgment flag is set to 1 if the prescribed condition of step S21 and the prescribed condition of step S22 are both satisfied. Instead, the condition judgment flag may be set to 1 if either one of the prescribed condition of step S21 and the prescribed condition of step S22 is satisfied. Furthermore, instead of performing only one of the condition judgment process (1) and the condition judgment process (2), both of these processes may be performed.

[3.4. Constant Velocity Travel Process]

Figure 11:
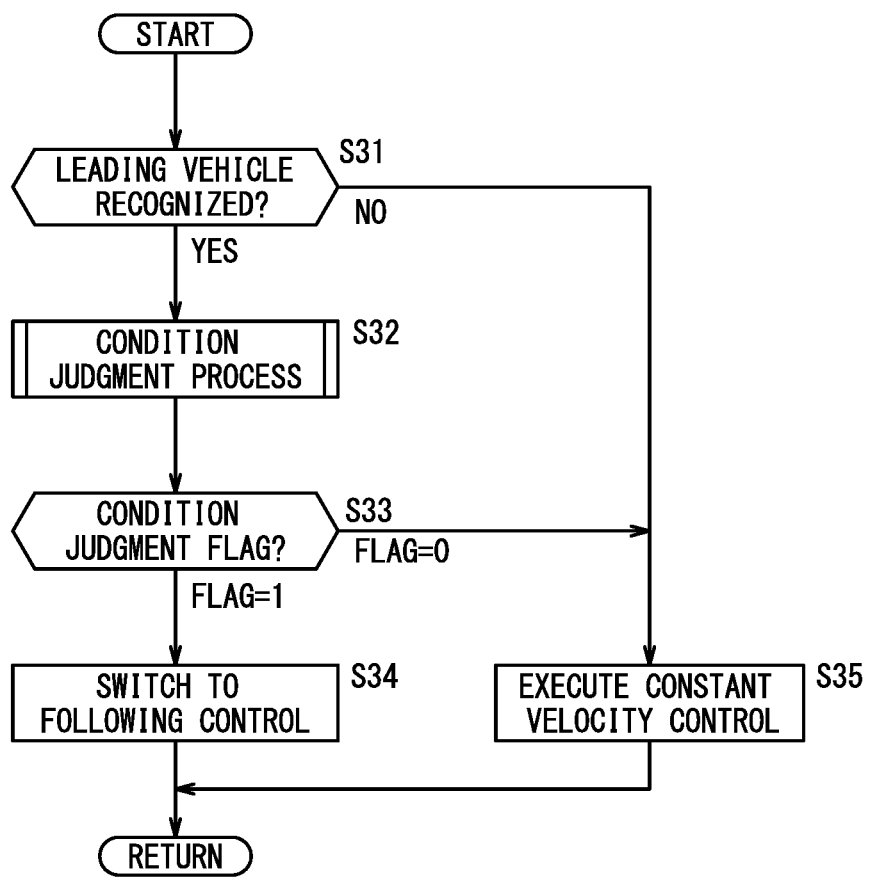
FIG. 11 is a flow chart of the constant velocity travel process.

The constant velocity travel process performed by the vehicle control apparatus 10 will be described using FIG. 11. The constant velocity travel process shown in FIG. 11 is performed repeatedly at prescribed intervals.

At step S31, the action planning section 86 judges whether the outside recognizing section 80 recognizes another vehicle 102. The other vehicle 102 that is a recognition target may be travelling in one of the user lane (first lane 112) and the other lane (second lane 114 and the like). If the outside recognizing section 80 recognizes the other vehicle 102 (step S31: YES), the process moves to step S32. On the other hand, if the outside recognizing section 80 does not recognize the other vehicle 102 (step S31: NO), the process moves to step S35.

At step S32, the action planning section 86 performs the condition judgment process described in section [3.2] or [3.3] above. When step S32 ends, the process moves to step S33.

At step S33, the action planning section 86 judges the condition judgment flag. If the condition judgment flag is 1 (step S33: FLAG=1), the process moves to step S34. On the other hand, if the condition judgment flag is 0 (step S33: FLAG=0), the process moves to step S35.

At step S34, the travel control section 92 switches the driving assistance control being performed from the constant velocity control to the following control. If the other vehicle 102 is the first other vehicle 102a travelling in the user lane, the travel control section 92 resumes the following control with the first other vehicle 102a as the following target. On the other hand, if the other vehicle 102 is the second other vehicle 102b travelling in the other lane, the travel control section 92 performs the automated lane change. The travel control section 92 resumes the following control with the second other vehicle 102b as the following target, after the automated lane change. When step S34 ends, the constant velocity travel process ends. After this, the other-vehicle following process described in section [3.1] above is resumed.

When the process moves from step S31 or step S33 to step S35, the travel control section 92 performs (continues) the constant velocity control. When step S35 ends, the constant velocity travel process shown in FIG. 11 ends for now.

4. Other Embodiments

Figure 12:
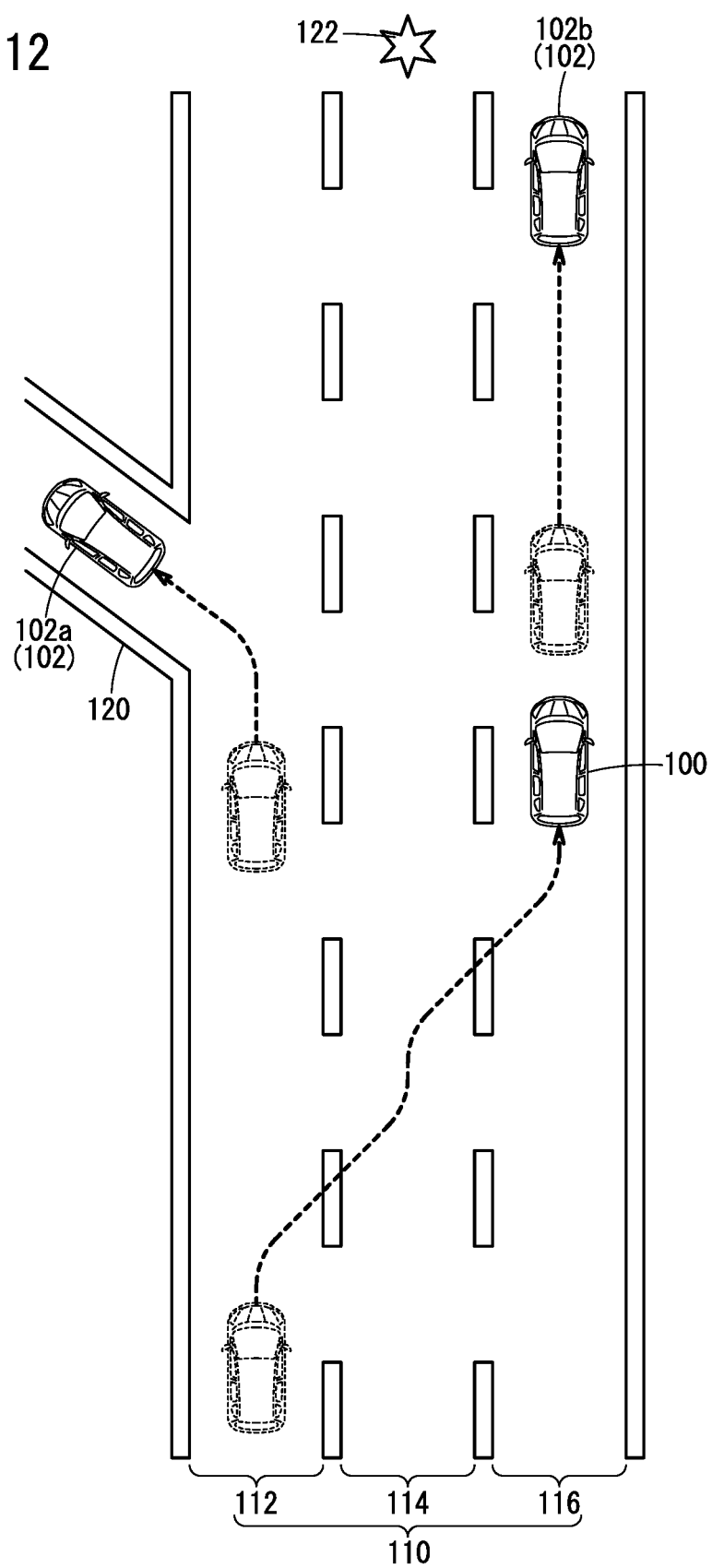
FIG. 12 is a diagram showing a situation in which the following control is performed with a second other vehicle travelling in a third lane as the following target.

When the user vehicle 100 is travelling in the first lane 112 such as shown in FIG. 12, the travel control section 92 may perform the following control with the second other vehicle 102b travelling in the third lane 116 as the following target. That is, the outside recognizing section 80 not only recognizes the other lane (second lane 114) adjacent to the user lane (first lane 112), but also recognizes a plurality of other lanes (second lane 114 and third lane 116).

If the outside recognizing section 80 recognizes a plurality of other vehicles 102, the action planning section 86 may select an optimal other vehicle 102 as the following target. In such a case, the action planning section 86 may select the other vehicle 102 that is closest to the user vehicle 100 as the optimal other vehicle 102, or the action planning section 86 may select the other vehicle 102 whose vehicle class is closest to that of the user vehicle 100 as the optimal other vehicle 102. Alternatively, the action planning section 86 may select the other vehicle 102 whose velocity is closest to that of the user vehicle 100 as the optimal other vehicle 102.

5. Technical Concepts Obtainable from the Embodiments

The following is a record of the technical concepts that can be understood from the embodiments described above.

One aspect of the present invention is a vehicle control apparatus 10 comprising an outside recognizing section 80 that recognizes a situation around a user vehicle 100 and a travel control section 92 (action planning section 86 and vehicle control section 88) that performs travel control of the user vehicle 100 based on a recognition result of the outside recognizing section 80, wherein, when following control that causes the user vehicle 100 to follow a following target that is a first other vehicle 102a travelling in a user path (first lane 112) in which the user vehicle 100 is travelling is being performed, the travel control section 92 transitions from a state in which the first other vehicle 102a is the following target to a state in which the first other vehicle 102a is not the following target, and in a case where the outside recognizing section 80 recognizes a second other vehicle 102b, which is travelling in another path (second lane 114 and the like) that is not the user path, the travel control section 92 determines whether to set the second other vehicle 102b as the following target based on a prescribed condition.

According to the above configuration, when the user vehicle 100 is performing the following control with the first other vehicle 102a as the following target, even if the first other vehicle 102a stops being the following target, it is possible to perform the following control with the second other vehicle 102b as the following target. Therefore, it is possible to provide the driver with highly convenient driving assistance.

In one aspect of the present invention, when the second other vehicle 102b is set as the following target, the travel control section 92 may cause the user vehicle 100 to change paths from the user path to the other path in which the second other vehicle 102b is travelling.

In one aspect of the present invention, when the second other vehicle 102b is not set as the following target, the travel control section 92 may perform constant velocity control causing the user vehicle 100 to travel at a prescribed velocity.

According to the above configuration, even if the first other vehicle 102a and the second other vehicle 102b are not recognized, the driving assistance can be continued through constant velocity control. Therefore, it is possible to provide the driver with highly convenient driving assistance.

In one aspect of the present invention, the travel control section 92 may judge the types of the user vehicle 100 and the second other vehicle 102b, as the prescribed condition.

According to the above configuration, it is possible to perform suitable following control.

In one aspect of the present invention, the travel control section 92 may judge a distance between the user vehicle 100 and the second other vehicle 102b or a travel time needed for the user vehicle 100 to reach a position of the second other vehicle 102b, as the prescribed condition.

According to the above configuration, it is possible to perform suitable following control.

In one aspect of the present invention, the travel control section 92 may judge a velocity difference between a set velocity for the user vehicle 100 and a travel velocity of the second other vehicle 102b, as the prescribed condition.

According to the above configuration, it is possible to perform suitable following control.

In one aspect of the present invention, the travel control section 92 may judge a relative velocity of the user vehicle 100 to the second other vehicle 102b, as the prescribed condition.

According to the above configuration, it is possible to perform suitable following control.

In one aspect of the present invention, if the second other vehicle 102b is not set as the following target, the travel control section 92 may perform constant velocity control causing the user vehicle 100 to travel at a prescribed velocity, and during performance of the constant velocity control, if the first other vehicle 102a or the second other vehicle 102b satisfying the prescribed condition is recognized, the travel control section 92 may resume the following control with the first other vehicle 102a or the second other vehicle 102b satisfying the prescribed condition as the following target.

According to the above configuration, it is possible to realize even more convenient driving assistance.

In one aspect of the present invention, a path-changeable region 130 in which it is possible to perform a path change automatically may be set as the prescribed condition, the travel control section 92 may set the second other vehicle 102b as the following target if a travel position of the second other vehicle 102b is inside the path-changeable region 130, and the travel control section 92 need not set the second other vehicle 102b as the following target if the travel position of the second other vehicle 102b is outside the path-changeable region 130.

According to the above configuration, cases where the destination 122 cannot be reached due to the following control being performed can be eliminated.

In one aspect of the present invention, if the user vehicle 100 must enter a branching path 120 from a path 110 on which the user vehicle 100 is currently travelling, the travel control section 92 may set the path-changeable region 130 based on a branching position P1 of the branching path 120, time needed for the path change, and travel velocity of the user vehicle 100.

In one aspect of the present invention, a prescribed threshold value D2 of a remaining distance to a destination 122 of the user vehicle 100 or the branching position P1 of the branching path 120 leading to the destination 122 may be set as the prescribed condition, and the travel control section 92 may set the second other vehicle 102b as the following target if the remaining distance from the travel position of the user vehicle 100 to the destination 122 or the branching position P1 is greater than the prescribed threshold value D2 and need not set the second other vehicle 102b as the following target if the remaining distance from the travel position of the user vehicle 100 to the destination 122 or the branching position P1 is less than the prescribed threshold value D2.

According to the above configuration, it is possible to prevent inefficient action.

Another aspect of the present invention is a vehicle control method comprising an outside recognition step of recognizing a situation around a user vehicle 100 and a travel control step of performing travel control of the user vehicle 100 based on a recognition result of the outside recognition step, wherein, in the travel control step, when following control that causes the user vehicle 100 to follow a following target that is a first other vehicle 102a travelling in a user path (first lane 112) in which the user vehicle 100 is travelling is being performed, a transition is made from a state in which the first other vehicle 102a is the following target to a state in which the first other vehicle 102a is not the following target, and when a second other vehicle 102b, which is travelling in another path (second lane 114 and the like) that is not the user path, is recognized in the outside recognition step, a determination is made concerning whether to set the second other vehicle 102b as the following target based on a prescribed condition.

In another aspect of the present invention, in the travel control step, if the second other vehicle 102b is set as the following target, the user vehicle 100 may be caused to change paths from the user path to the other path in which the second other vehicle 102b is travelling.

The vehicle control apparatus and vehicle control method according to the present invention are not limited to the above-described embodiments, and it goes without saying that various configurations could be adopted therein without departing from the scope of the present invention.

What is claimed is:

1. A vehicle control apparatus comprising one or more processors that execute computer-executable instructions stored in a memory, wherein the one or more processors execute the computer-executable instructions to cause the vehicle control apparatus to:

recognize a situation around a user vehicle;

perform travel control of the user vehicle based on a recognition result;

set a prescribed threshold value of a remaining distance to a destination of the user vehicle or a branching position of the branching path leading to the destination, as a prescribed condition;

when following control that causes the user vehicle to follow a following target that is a first other vehicle travelling in a user path in which the user vehicle is travelling is being performed, transition from a state in which the first other vehicle is the following target to a state in which the first other vehicle is not the following target, and in a case where a second other vehicle, which is travelling in another path that is not the user path, is recognized, determine whether to set the second other vehicle as the following target based on the prescribed condition; and set the second other vehicle as the following target if the remaining distance from the travel position of the user vehicle to the destination or the branching position is greater than the prescribed threshold value, and not set the second other vehicle as the following target if the remaining distance from the travel position of the user vehicle to the destination or the branching position is less than the prescribed threshold value.

2. The vehicle control apparatus according to claim 1, wherein:
when the second other vehicle is set as the following target, the one or more processors cause the vehicle control apparatus to cause the user vehicle to change paths from the user path to the another path in which the second other vehicle is travelling.

3. The vehicle control apparatus according to claim 1, wherein:
when the second other vehicle is not set as the following target, the one or more processors cause the vehicle control apparatus to perform constant velocity control causing the user vehicle to travel at a prescribed velocity.

4. The vehicle control apparatus according to claim 1, wherein:
the one or more processors cause the vehicle control apparatus to judge types of the user vehicle and the second other vehicle, as the prescribed condition.

5. The vehicle control apparatus according to claim 1, wherein:
the one or more processors cause the vehicle control apparatus to judge a distance between the user vehicle and the second other vehicle or a travel time needed for the user vehicle to reach a position of the second other vehicle, as the prescribed condition.

6. The vehicle control apparatus according to claim 1, wherein:
the one or more processors cause the vehicle control apparatus to judge a velocity difference between a set velocity for the user vehicle and a travel velocity of the second other vehicle, as the prescribed condition.

7. The vehicle control apparatus according to claim 1, wherein:
the one or more processors cause the vehicle control apparatus to judge a relative velocity of the user vehicle to the second other vehicle, as the prescribed condition.

8. The vehicle control apparatus according to claim 4, wherein:
the one or more processors cause the vehicle control apparatus to:
if the second other vehicle is not set as the following target, perform constant velocity control causing the user vehicle to travel at a prescribed velocity; and
during performance of the constant velocity control, if the first other vehicle or the second other vehicle satisfying the prescribed condition is recognized, resume the following control with the first other vehicle or the second other vehicle satisfying the prescribed condition as the following target.

9. The vehicle control apparatus according to claim 1, wherein:
the one or more processors cause the vehicle control apparatus to:
set a path-changeable region in which it is possible to perform a path change automatically, as the prescribed condition,
set the second other vehicle as the following target if a travel position of the second other vehicle is inside the path-changeable region, and not set the second other vehicle as the following target if the travel position of the second other vehicle is outside the path-changeable region.

10. The vehicle control apparatus according to claim 9, wherein:
the one or more processors cause the vehicle control apparatus to:
if the user vehicle must enter a branching path from a road on which the user vehicle is currently travelling, set the path-changeable region based on a branching position of the branching path, time needed for the path change, and travel velocity of the user vehicle.

11. A vehicle control method comprising:
recognizing a situation around a user vehicle;
performing travel control of the user vehicle based on a recognition result;
setting a prescribed threshold value of a remaining distance to a destination of the user vehicle or a branching position of the branching path leading to the destination, as a prescribed condition;
when following control that causes the user vehicle to follow a following target that is a first other vehicle travelling in a user path in which the user vehicle is travelling is being performed, transitioning from a state in which the first other vehicle is the following target to a state in which the first other vehicle is not the following target, and in a case where a second other vehicle, which is travelling in another path that is not the user path, is recognized, determining whether to set the second other vehicle as the following target based on the prescribed condition; and
setting the second other vehicle as the following target if the remaining distance from the travel position of the user vehicle to the destination or the branching position is greater than the prescribed threshold value, and not setting the second other vehicle as the following target if the remaining distance from the travel position of the user vehicle to the destination or the branching position is less than the prescribed threshold value.

12. The vehicle control method according to claim 11, further comprising:
if the second other vehicle is set as the following target, causing the user vehicle to change paths from the user path to the another path in which the second other vehicle is travelling.

* * * * *